(12) United States Patent
Dieterich et al.

(10) Patent No.: US 12,489,331 B2
(45) Date of Patent: Dec. 2, 2025

(54) CONNECTION UNIT FOR A STATOR, STATOR ARRANGEMENT FOR AN ELECTRIC MACHINE, METHOD FOR PRODUCING A STATOR ARRANGEMENT, AND ELECTRIC MACHINE FOR DRIVING A VEHICLE

(71) Applicant: Valeo eAutomotive Germany GmbH, Erlangen (DE)

(72) Inventors: Sebastian Dieterich, Bad Neustadt a.d.Saale (DE); Bianca Hofmann, Bad Neustadt a.d.Saale (DE); Michael Menz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 193 days.

(21) Appl. No.: 18/257,103

(22) PCT Filed: Nov. 29, 2021

(86) PCT No.: PCT/EP2021/083341
§ 371 (c)(1),
(2) Date: Jun. 13, 2023

(87) PCT Pub. No.: WO2022/128424
PCT Pub. Date: Jun. 23, 2022

(65) Prior Publication Data
US 2024/0106291 A1    Mar. 28, 2024

(30) Foreign Application Priority Data
Dec. 15, 2020    (DE) .................... 10 2020 215 910.6

(51) Int. Cl.
*H02K 15/33* (2025.01)
*H02K 3/28* (2006.01)
*H02K 15/02* (2006.01)

(52) U.S. Cl.
CPC ............... *H02K 3/28* (2013.01); *H02K 15/02* (2013.01); *H02K 15/33* (2025.01); *H02K 2203/09* (2013.01)

(58) Field of Classification Search
CPC ...................................................... H02K 15/33
(Continued)

(56) References Cited

U.S. PATENT DOCUMENTS 5,465,016 A * 11/1995 Mancl ................... H02K 5/225
                                                              310/249
5,613,529 A *  3/1997 Tanaka .................. H02K 15/30
                                                              140/71 R
(Continued)

FOREIGN PATENT DOCUMENTS

EP    1 776 738 B1     7/2011
EP    3 051 671 B1    11/2018
(Continued)

OTHER PUBLICATIONS

International Search Report issued Feb. 28, 2022 in PCT/EP2021/083341 filed on Nov. 29, 2021, 2 pages.

*Primary Examiner* — Alexander Talpalatski
(74) *Attorney, Agent, or Firm* — Oblon, McClelland, Maier & Neustadt, L.L.P.

(57) ABSTRACT

Connection unit for a stator with a stator winding having a number N of phases, having first to Nth contact portions, which are each designed for electrically conductively contacting one of N connection portions of the stator, form a receiving chamber for receiving one of the connection portions and have a guide. A respective contact portion has a wall, which limits the receiving chamber on one side, and the guide of the contact portion has a wall, which adjoins the wall of the contact portion and is bevelled with respect to the wall of the contact portion in a manner facing away from the receiving chamber. A conductor arrangement, which either (Continued)

electrically conductively connects the first to Nth contact portions or comprises N conductor portions, which are electrically isolated from one another and are each electrically conductively connected to one of the contact portions.

19 Claims, 9 Drawing Sheets

(58) Field of Classification Search
USPC .......................................................... 310/71
See application file for complete search history.

(56) References Cited

U.S. PATENT DOCUMENTS

| | | | |
|---|---|---|---|
| 6,091,172 A * | 7/2000 | Kakinuma | H02K 11/40 |
| | | | 310/194 |
| 6,300,698 B1 * | 10/2001 | Fargo | H01R 39/32 |
| | | | 310/91 |
| 10,050,483 B2 * | 8/2018 | Sambuichi | H02K 15/33 |
| 2016/0149454 A1 * | 5/2016 | Haga | H02K 3/28 |
| | | | 310/71 |
| 2016/0218578 A1 | 7/2016 | Yamada et al. | |
| 2021/0044184 A1 * | 2/2021 | Guardiola | H02K 3/38 |

FOREIGN PATENT DOCUMENTS

| | | |
|---|---|---|
| EP | 3 561 962 A1 | 10/2019 |
| FR | 3 054 745 A1 | 2/2018 |

* cited by examiner

CONNECTION UNIT FOR A STATOR, STATOR ARRANGEMENT FOR AN ELECTRIC MACHINE, METHOD FOR PRODUCING A STATOR ARRANGEMENT, AND ELECTRIC MACHINE FOR DRIVING A VEHICLE

The present invention relates to a connection unit for a stator with a stator winding having a number N of phases. In addition, the invention relates to a stator arrangement for an electric machine, a method for producing a stator arrangement, and an electric machine for driving a vehicle.

Connection units for a stator with a stator winding having N phases are used for connecting connection portions of the stator winding. For this, the connection unit comprises a number of contact portions corresponding to the number of phases, and a conductor arrangement. The contact portions each have a receiving chamber for one of the connection portions.

In order to form a star point, the conductor arrangement can electrically conductively connect the contact portions. Thus, DE 10 2019 122 550 A1 discloses an electric machine with a stator core and hairpins, which are connected in order to form windings and to form a continuous circuit between a terminal end and a neutral end. A neutral connection is attached to each of the neutral ends and comprises an arcuate body with an inside and outside. The inside defines open slots, wherein each of the slots receives one of the neutral ends.

However, arranging the connection portions in the receiving chambers can be made difficult by the fact that the connection portions have manufacturing-induced position tolerances.

The invention is based on the object of specifying an installation-friendly option for connecting connection portions of a stator.

This object is achieved according to the invention by a connection unit for a stator with a stator winding having a number N of phases, having first to Nth contact portions, which are each designed for electrically conductively contacting one of N connection portions of the stator, form a receiving chamber for receiving one of the connection portions and have a guide, wherein a respective contact portion has a wall, which limits the receiving chamber on one side, and the guide of the contact portion has a wall, which adjoins the wall of the contact portion and is bevelled with respect to the wall of the contact portion in a manner facing away from the receiving chamber, and a conductor arrangement, which either electrically conductively connects the first to Nth contact portions or comprises N conductor portions, which are electrically isolated from one another and are each electrically conductively connected to one of the contact portions.

The connection unit according to the invention for a stator with a stator winding having a number N of phases has first to Nth contact portions. The first to Nth contact portions are each designed for electrically conductively contacting one of N connection portions of the stator. The first to Nth contact portions each form a receiving chamber for receiving one of the connection portions. The first to Nth contact portions each have a guide. A respective contact portion has a wall. The wall of the contact portion limits the receiving chamber on one side. The guide of the contact portion has a wall. The wall of the guide adjoins the wall of the contact portion and is bevelled with respect to the wall of the contact portion in a manner facing away from the receiving chamber. The connection unit furthermore has a conductor arrangement. The conductor arrangement either electrically conductively connects the first to Nth contact portions or comprises N conductor portions, which are electrically isolated from one another and are each electrically conductively connected to one of the contact portions.

The connection device according to the invention is distinguished in particular by the guide, which permits position tolerances of the connection portions to be compensated for when the connection unit is arranged on the connection portions. If, for manufacturing reasons, the connection portions are not precisely aligned in accordance with the positions of the contact portions, they can be received, or—metaphorically speaking—captured, more easily in the receiving chambers as a result of the guides. The arrangement of the connection portions in the contact portions can thus be made significantly easier and can be easily automated. In particular, it is possible to dispense with additional tools, which hold the connection portions in a predefined position for attaching a conventional connection unit to the connection portions. Advantageously, installation of a stator arrangement or electric machine having the connection unit and a stator can be considerably simplified.

Adjacent pairs of contact portions are preferably arranged equidistantly.

The guide is preferably arranged at an end of a respective contact portion lying opposite the conductor arrangement. N is typically greater than or equal to three, in particular precisely equal to three. The Nth contact portion is preferably arranged between the first and the (N−1)th contact portion. In a preferred embodiment, the contact portions are configured as recesses of the conductor arrangement. The guide is preferably designed to adjoin the wall of the contact portion. The first wall of the guide can enclose an, in particular obtuse, angle with the first wall of the contact portion.

In the case of the connection unit according to the invention, provision can be made that the Nth contact portion has a second wall, which limits the receiving chamber on one side lying opposite to the first wall, and therefore the Nth contact portion is designed for surrounding the connection portion. The Nth contact portion can therefore form a reference position for the other contact portions and enclose one of the connection portions on both sides.

In a preferred embodiment, provision is made that the guide of the Nth contact portion has a second wall, which adjoins the second wall of the contact portion and is bevelled with respect to the second wall of the Nth contact portion in a manner facing away from the receiving chamber such that the guide is widened in comparison to a distance of the first wall of the contact portion from the second wall of the Nth contact portion. The guide can thus compensate for the position tolerances of the connection portion in two directions. The second wall of the contact portion can enclose an, in particular obtuse, angle with the second wall of the guide. The first wall and the second wall of the guide can extend along straight lines, which enclose an acute angle, in particular an angle between 40 and 80 degrees.

The Nth contact portion can furthermore comprise a third wall, which limits the receiving chamber in a direction perpendicular to the first wall. The third wall can form a stop for the connection portion to be received in the receiving chamber. The third wall preferably runs perpendicularly to the second wall. The third wall can connect the first wall and the second wall.

According to a first preferred embodiment variant, the receiving chamber of a respective one of the first to (N−1)th contact portions is open on a side lying opposite the first wall. This enables the connection portions to be easily received in the receiving chambers when the connection portions are radially aligned with respect to one another. The connection unit can therefore be arranged on the connection portions via a linear movement directed perpendicularly to or along a direction of extent of the connection portions since the connection portions, which are aligned differently in relation to the linear movement, cannot become jammed on the open side.

According to a second preferred embodiment variant, the first to (N−1)th contact portions each have a second wall, which lies opposite the first wall and is bevelled in a manner facing away from the receiving chamber. This enables the connection portions to be easily received in the receiving chambers when the connection portions are radially aligned with respect to one another. The connection unit can therefore be arranged on the connection portions by means of a linear movement directed perpendicularly to or along a direction of extent of the connection portions since the connection portions, which are aligned differently in relation to the linear movement do not become jammed against the second wall but can slide along it. The second wall of the contact portion is preferably bevelled towards the Nth contact portion.

According to a third preferred embodiment variant, a respective one of the first to (N−1)th contact portions has a second wall, which limits the receiving chamber on one side lying opposite to the first wall, and therefore the respective contact portion is designed for surrounding the connection portion. The first and second walls of the N contact portions are particularly preferably aligned parallel to one another. The connection unit may therefore be arranged on the connection portions via a linear movement directed perpendicularly to or along an extent direction of the connection portions when the connection portions are aligned parallel to each other.

It is preferred here that the guides of a respective one of the first to (N−1)th contact portions in each case has a second wall, which adjoins the second wall of the contact portion and is bevelled with respect to the second wall of the respective contact portion in a manner facing away from the receiving chamber such that the guide is widened in comparison to a distance of the first wall of the contact portion from the second wall of the respective contact portion. The second wall of the contact portion can enclose an, in particular obtuse, angle with the second wall of the guide. The first wall and the second wall of the guide can extend along straight lines, which enclose an acute angle, in particular an angle between 40 and 80 degrees. The guides of the first to Nth contact portions can be identical in design.

Provision can furthermore be made that the first to (N−1)th contact portions each have a further wall, which limits the receiving chamber in a direction perpendicular to the first wall. The further wall can form a stop for the connection portion to be received in the receiving chamber. If the contact portion has the second wall, provision can be made that the further wall runs perpendicularly to the second wall and/or connects the first wall and the second wall.

Preferably, the conductor arrangement of the connection unit is configured as a busbar when the conductor arrangement electrically conductively connects the contact portions. If the conductor arrangement comprises the conductor portions, a respective conductor portion can be configured as a busbar.

Preferably, the connection unit according to the invention furthermore comprises an isolation body, which is arranged, in particular moulded, on the conductor arrangement and has openings exposing the contact portions. The isolation body can be formed by a sheath surrounding the conductor arrangement in portions and/or continuously. The isolation body is preferably formed by insert-moulding of the conductor arrangement. The isolation body may furthermore establish relative positions of the conductor portions.

In addition, the connection unit according to the invention can have a fastening portion, which is designed to engage with a fastening portion of a further connection unit in such a manner that the connection unit and the further connection unit can be transferred from a detached position into a fastened position, in, which the connection unit and the further connection unit are fastened to one another and the conductor arrangement of the connection unit and a conductor arrangement of the further connection unit are electrically isolated from one another. All statements relating to the connection unit according to the invention can be transferred to the further connection unit.

In the fastened position, the contact portions of the connection unit and the further connection unit can be contacted by the connection portions of the stator winding.

This enables the connection portions to be fastened without additional tools, which position the connection portions, to the connection units, for example by welding. In this way, the ease of installation can be further increased.

The fastening portion can form a latching element, which is designed to engage with a latching element of the fastening portion of the further connection unit in the fastened position so as to form a latching connection. The latching connection here enables fastening of the connection units with little effort and without additional tools. The latching element can be designed to be elastically deformed during the transfer from the detached position to the fastened position. It is possible that the fastening portion furthermore forms one or more further corresponding latching elements.

Alternatively or additionally, provision can be made that the fastening portion forms a protrusion or a recess, wherein the protrusion can correspond to a fastening portion, configured as a recess, of the further connection unit, or the recess can correspond to a fastening portion, configured as a protrusion, of the further connection unit. In the fastened position, the fastening portions can engage together forming a form-fitting connection. The protrusion and the recess preferably have a diametrically opposed configuration. The fastening portion can have one or more further protrusions and recesses.

The isolation body of the connection unit according to the invention preferably forms the fastening portion. Provision can be made here that the isolation body or the conductor arrangement of the further connection unit forms its fastening portion. Alternatively, the conductor arrangement of the connection unit according to the invention forms the fastening portion. Provision can be made here that the isolation body of the further connection unit forms its fastening portion.

The object on, which the invention is based is furthermore achieved by a stator arrangement for an electric machine, having: a stator, having a stator core with an axial end face and a stator winding, which has a number N of phases and is formed in portions from shaped conductors, which extend through the stator core, and from first to Nth connection portions, which extend in the axial direction at the end face, adjoining a part of the shaped conductors in different angular positions of a circumferential direction, and are designed either for forming a star point or for forming connections for the phases; and a connection unit according to the invention, wherein the first to Nth connection portions are each received in the receiving chamber of a contact portion of the connection unit.

The stator arrangement according to the invention for an electric machine has a stator. The stator has a stator core. The stator core has an axial end face. The stator furthermore has a stator winding. The stator winding has a number N of phases. The stator winding is formed in portions from shaped conductors. The shaped conductors extend through the stator core. The stator winding is furthermore formed in portions from first to Nth connection portions. The first to Nth connection portions extend in the axial direction at the end face, adjoining a part of the shaped conductors in different angular positions of a circumferential direction. The first to the Nth connection portions are designed either to form a star point or to form connections for the phases. The stator arrangement furthermore has a connection unit according to the invention. The first to Nth connection portions are each received in the receiving chamber of a contact portion of the connection unit.

The stator core is preferably formed by a multiplicity of mutually isolated stator laminations. A multiplicity of slots, which is arranged along the circumferential direction and which extends from the end face to an axially opposite further end face, can be formed in the stator core. The shaped conductors can be received in the slots.

The shaped conductors are preferably formed by rods made of an electrically conductive metal, in particular copper. The shaped conductors are preferably arranged, radially layered in a respective slot, with a predetermined even number of layers, in particular four, six, eight, ten or twelve layers. The number of phases typically corresponds to a number of phases of the stator.

The stator winding can be designed as a hairpin winding. At the first end face and at a second end face opposite the first end face, the shaped conductors of a respective phase can be electrically conductively connected to one another by connectors such that they form a series circuit or a plurality of series circuits. Connectors of the first type are preferably formed integrally with the shaped conductors at the first end face. At the second end face, pairs of shaped conductors can be electrically conductively connected by connectors of the second type. The connectors of the second type can each comprise two connecting portions, which, in particular, integrally adjoin the shaped conductors of the pair. The connecting portions can be electrically conductively connected to one another in pairs, in particular by substance bonding.

Each connection portion can comprise a plurality of connection elements, which each adjoin one of the shaped conductors. Each connection portion preferably comprises a connection element for each series circuit of the phase.

Provision can furthermore be made, in the case of the stator arrangement according to the invention, that the conductor arrangement of the first connection unit electrically conductively connects the contact portions to form a star point, wherein the stator arrangement furthermore has: a second connection unit according to the invention, the conductor arrangement of, which comprises N conductor portions, which are electrically isolated from one another and are each electrically conductively connected to one of the N contact portions in order to form a connection for one of the phases, wherein the (N+1)th to (2N)th connection portions are each accommodated in the receiving chamber of a contact portion of the second connection unit.

Provision can be made that the first to Nth connection portions and/or the (N+1)th to (2N)th connection portions of the stator are radially aligned in the circumferential direction in their respective angular position.

In the stator, the connection portions can comprise a pair of parallel side faces.

Provision can be made here that the first to (N−1)th connection portions are deformed relative to the Nth connection portion such that the pairs of parallel side faces of the first to Nth connection portions are aligned substantially parallel to one another. Alternatively or additionally, the (N+1)th to (2N−1)th connection portions can be deformed relative to the (2N)th connection portion such that the pairs of parallel side faces of the (N+1)th to (2N)th connection portions are aligned substantially parallel to one another. The first to Nth connection portions or the (N+1)th to (2N)th connection portions can have the same orientation such that their pairs of parallel side faces are aligned substantially parallel to one another.

The pairs of parallel side faces of the first to (2N)th connection portions can be aligned parallel to one another. It is, however, preferred that the pairs of parallel side faces of the first to Nth connection portions on the one hand and the pairs of parallel side faces of the (N+1)th to (2N)th connection portions on the other are aligned differently, in particular enclose an angle of greater than zero.

In a preferred embodiment, the connection portions are deformed by torsion about an axis parallel to a longitudinal axis of the stator. For this purpose, the first to (N−1)th connection portions and/or the (N+1)th to (2N−1)th connection portions can comprise a torsion portion, which forms the torsion.

In the case of the stator arrangement according to the invention, it is preferred that a fastening means is provided by means of, which the first connection unit and the second connection unit can be transferred from a detached position into a fastened position, in, which the first connection unit and the second connection unit are fastened to one another and the conductor arrangement of the first connection unit and the conductor arrangement of the second connection unit are electrically isolated from one another.

The fastening means can be formed by the fastening portions of the first and second connection units. The connection unit described as the further connection unit in relation to the connection unit according to the invention can be the second connection unit of the stator arrangement.

Alternatively, the fastening means can be designed to force the first connection unit and the second connection unit together in the fastened position as a result of a force acting on the first connection unit and the second connection unit, such that the connection portions of the stator are fastenable to the contact portions in an electrically conductive manner, in particular by a substance-bonded joining process. In this embodiment, the fastening means is therefore provided as an additional component, which is separate from the connection units. The fastening means is preferably designed such that it can be detached from the connection units in the fastened position, and preferably moved back into the detached position.

The object on, which the invention is based is furthermore achieved by a method for producing a stator arrangement, comprising the following steps: providing a connection unit according to the invention; providing a stator for an electric machine, having a stator core with an axial end face and a stator winding, which comprises a number N of phases and is formed in portions from shaped conductors, which extend through the stator core, and from first to Nth connection portions, which extend in the axial direction at the end face, adjoining a part of the shaped conductors in different angular positions of a circumferential direction, and are designed either for forming a star point or for forming connections for the phases;

and arranging the first to Nth connection portions of the stator in the receiving chambers of the contact portions of the connection unit. The arrangement can take place by performing a relative movement of the connection unit along a movement direction running substantially perpendicular or parallel, in particular perpendicular or parallel, to a direction of extent of the connection portions.

In the case of the method according to the invention, provision can furthermore be made that the first to Nth contact portions are designed for forming a star point, wherein the stator winding is furthermore formed in portions from (N+1)th to (2N)th connection portions, which extend in the axial direction at the end face, adjoining a part of the shaped conductors in different angular positions of a circumferential direction, and are designed for forming connections for the phases, wherein the method can furthermore comprise the following steps: providing a second connection unit according to the invention, the conductor arrangement of, which comprises N conductor portions, which are electrically isolated from one another and are each electrically conductively connected to one of the N contact portions in order to form a connection for one of the phases; and arranging the (N+1)th to (2N)th connection portions of the stator in the receiving chambers of the contact portions of the second connection unit. The arrangement can take place by performing a relative movement of the second connection unit along a movement direction running substantially perpendicular or parallel, in particular perpendicular or parallel, to a direction of extent of the connection portions.

Furthermore, the following step can be provided: joining of the connection portions and the contact portions, in particular so as to form substance-bonded joint connections. Preferably, the joining takes place by means of welding.

Also, the following step can be provided: transferring the first connection unit and the second connection unit from a detached position into a fastened position by means of a fastening means or by means of fastening portions formed by the connection units, wherein, in the fastened position, the first connection unit and the second connection unit are fastened to one another and the conductor arrangement of the first connection unit and the conductor arrangement of the second connection unit are electrically isolated from one another.

In particular, if the fastening means is not formed by the connection units, a step can furthermore be provided of removing the fastening means by transferring it from the fastened position into the detached position after the connection portions and the contact portions are joined.

All statements relating to the connection unit according to the invention can be transferred to the method according to the invention, such that the above-described advantages can also be achieved with said method.

The object on which the invention is based is furthermore achieved by an electric machine for driving a vehicle, having: a stator arrangement according to the invention or a stator arrangement obtained by the method according to the invention; and a rotor rotatably mounted within the stator.

The electric machine is preferably designed as a synchronous machine or as an asynchronous machine. The rotor is preferably permanently excited.

Further advantages and details of the present invention are derived from the exemplary embodiments described below and from the drawings. The drawings are schematic illustrations in, which:

Figure 2:
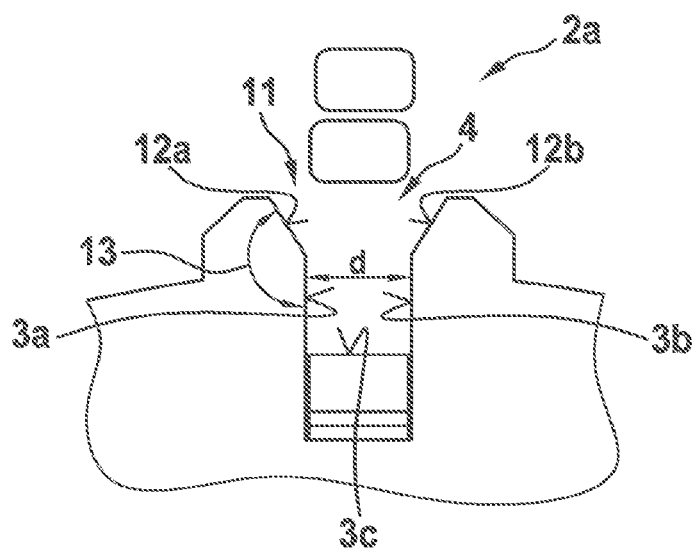
FIG. 2 shows a view of a detail of a contact portion of the connection unit according to the first exemplary embodiment.
Figure 6:
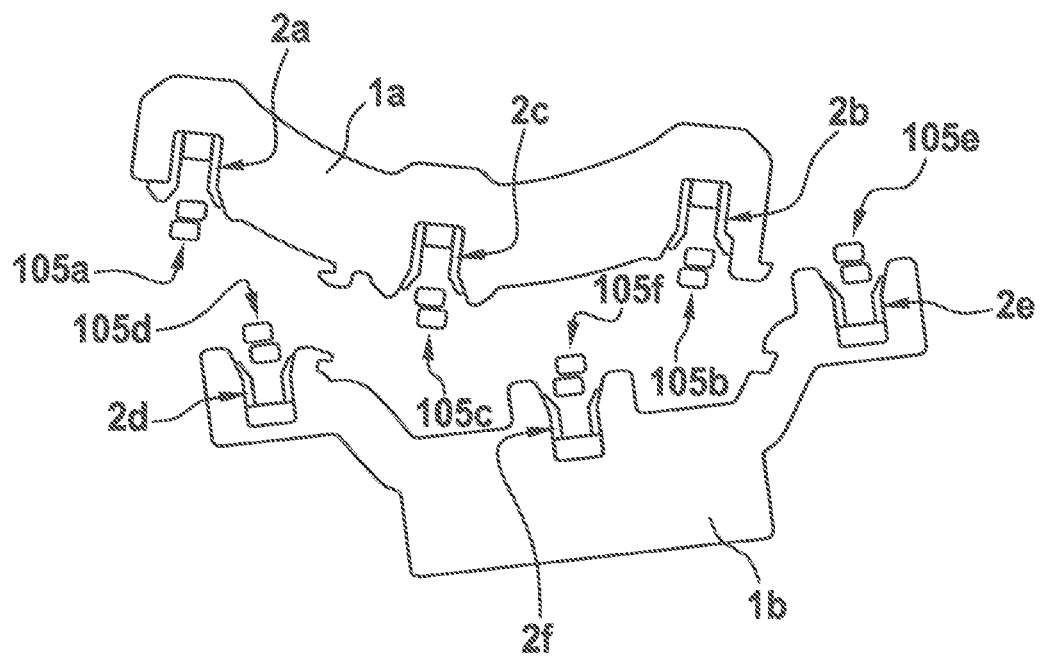
Figure 7:
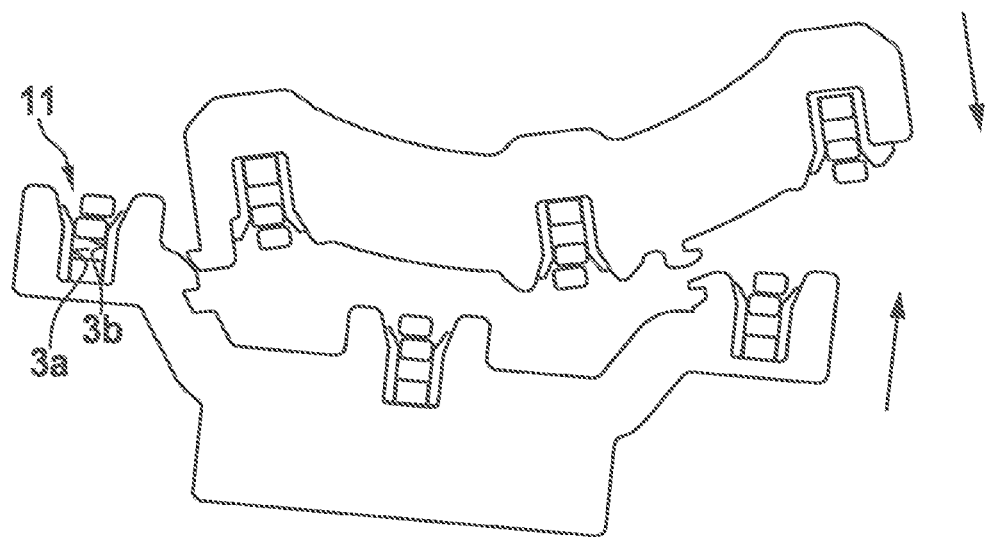
Figure 8:
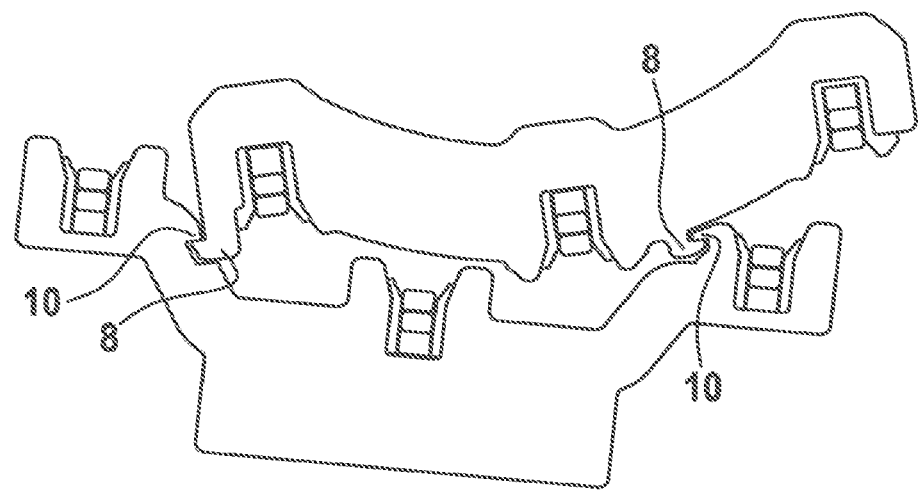
Figure 9:
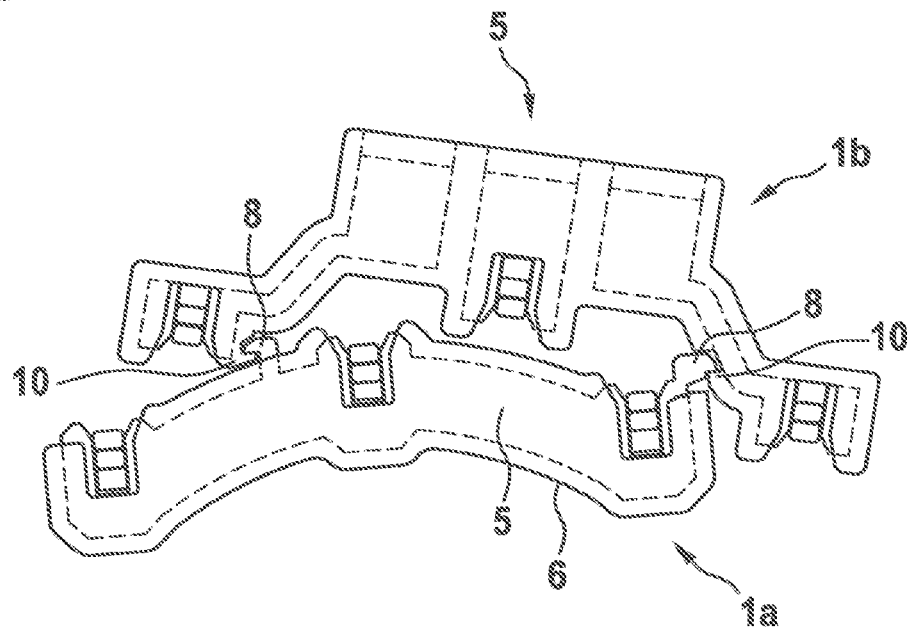
Figure 10:
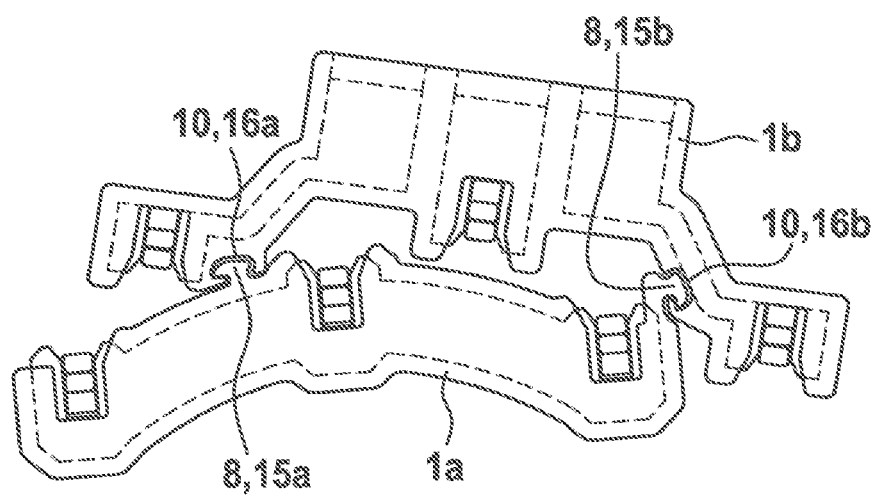
Figure 11:
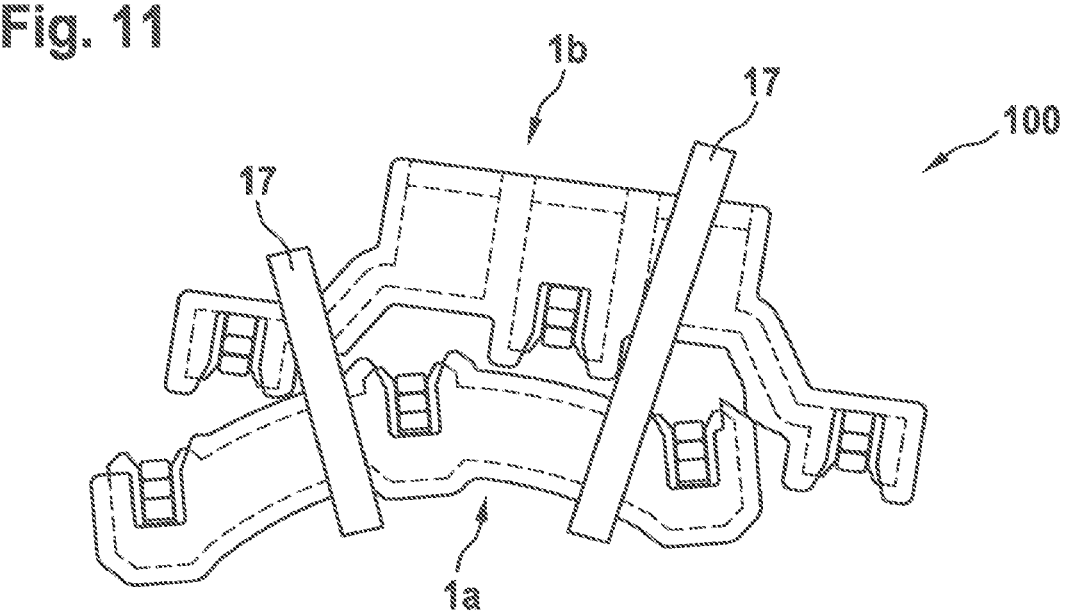
Figure 12:
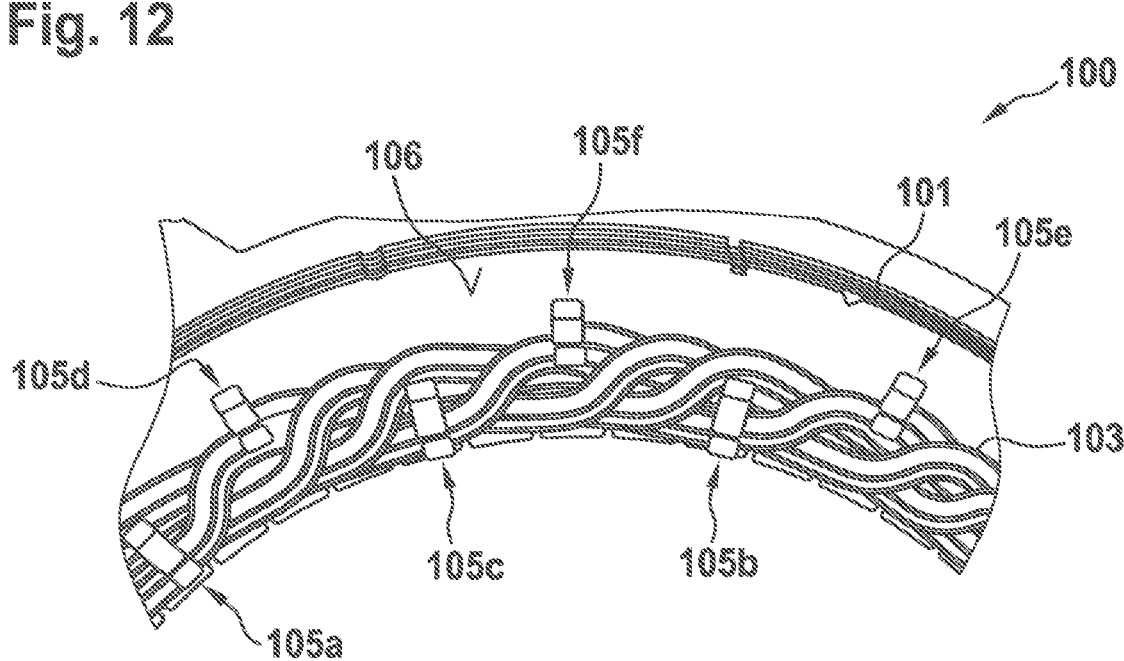
Figure 13:
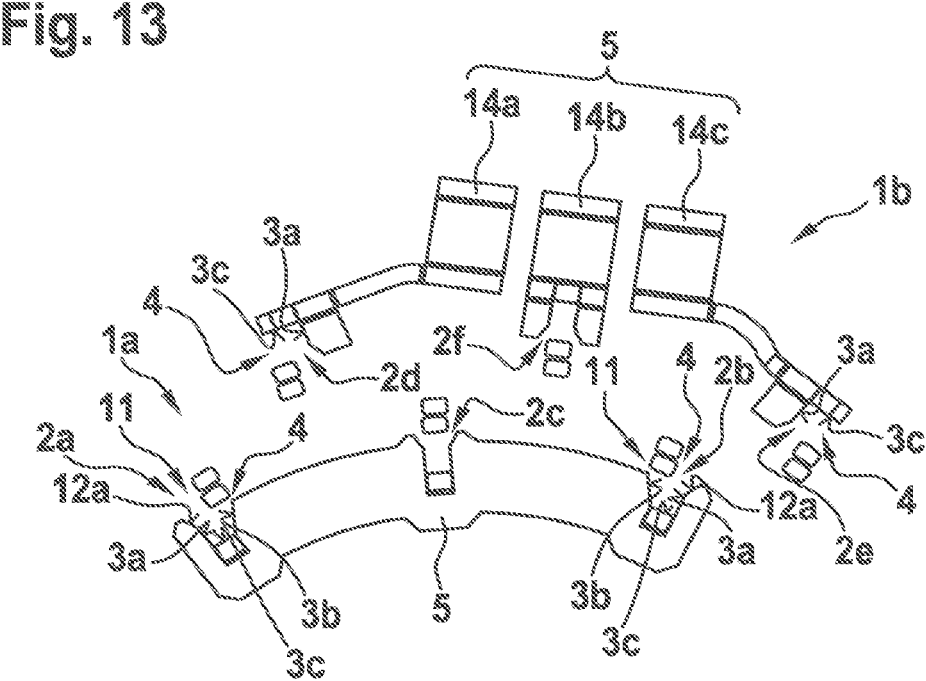
Figure 14:
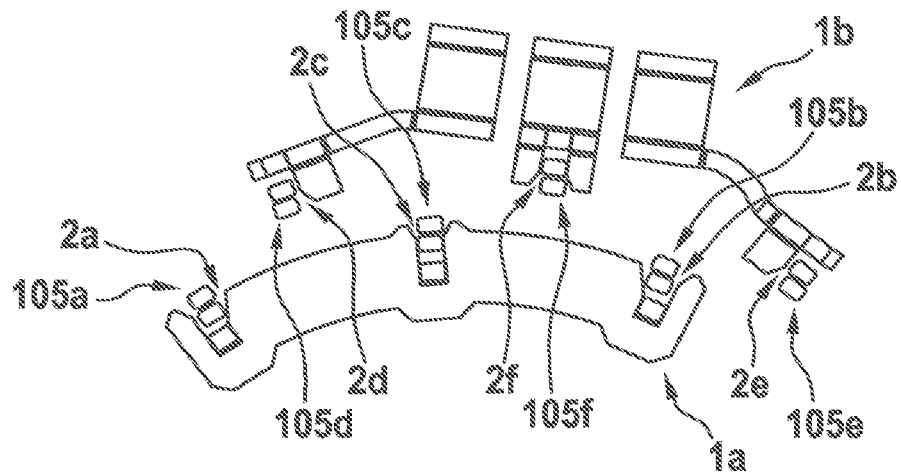
Figure 15:
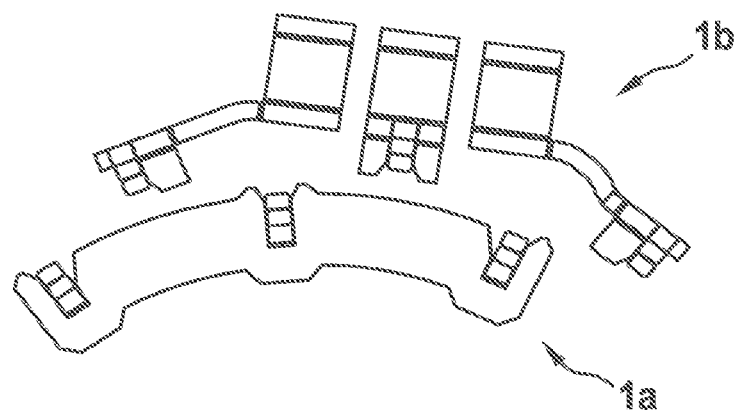
Figure 16:
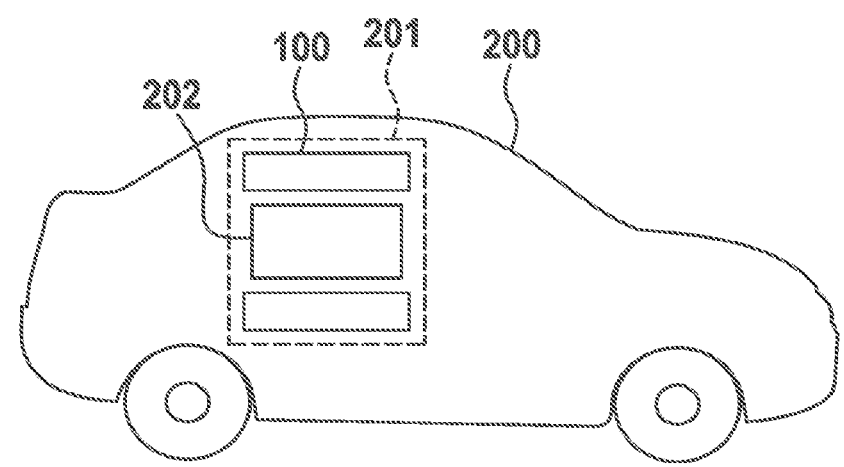

FIGS. 6 to 8 each show a plan view of the connection units at the transition from a detached position to a fastened position;

FIG. 9 shows a plan view of a third exemplary embodiment of the connection unit according to the invention;

FIG. 10 shows a plan view of a fourth and a fifth exemplary embodiment of the connection unit according to the invention;

FIG. 11 shows a plan view of a further exemplary embodiment of the stator arrangement according to the invention with a sixth and a seventh exemplary embodiment of the connection unit according to the invention;

FIG. 12 shows an end-face view of a detail of a stator of a further exemplary embodiment of the stator arrangement according to the invention;

FIGS. 13 to 15 each show a plan view of two connection units according to an eighth and a ninth exemplary embodiment of the stator arrangement shown in FIG. 2 during the transition from a detached position into a fastened position; and FIG. 16 shows a schematic diagram of a vehicle with an exemplary embodiment of the electric machine according to the invention.

Figure 1:
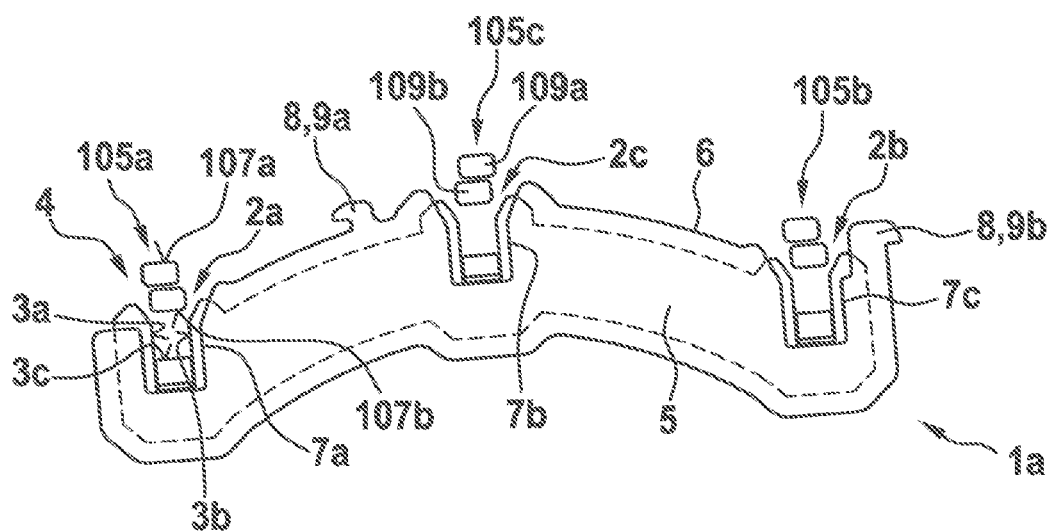
FIG. 1 shows a plan view of a first exemplary embodiment of the connection unit according to the invention.

FIG. 1 is a plan view of a first exemplary embodiment of a connection unit 1*a*.

The connection unit 1*a* has three contact portions 2*a*, 2*b*, 2*c*. Each contact portion 2*a*, 2*b*, 2*c* has a first wall 3*a* and a second wall 3*b*, which in FIG. 1 are provided with reference signs on the contact portion 2*a* as representative of the contact portions 2*b*, 2*c*. Each contact portion 2*a*, 2*b*, 2*c* forms a receiving chamber 4, which is designed to surround one of three connection portions 105*a*, 105*b*, 105*c* of a stator 101 (see FIG. 4) and is limited by the first wall 3*a* and the second wall 3*b*. The walls 3*a*, 3*b* of all the contact portions 2*a*, 2*b*, 2*c* are oriented parallel to one another. Moreover, each contact portion 2*a*, 2*b*, 2*c* comprises a third wall 3*c*, which runs perpendicularly to the first wall 3*a* and to the second wall 3*b* and likewise limits the receiving chamber.

In addition, the connection unit 1*a* has a conductor arrangement 5, which electrically conductively connects the contact portions 2*a*, 2*b*, 2*c*. For this purpose, the conductor arrangement 5 is formed as an e.g. arcuate or crescent-shaped busbar. The contact portions 2*a*, 2*b*, 2*c* are formed as recesses in the conductor arrangement 5 or in the busbar.

The connection unit 1*a* furthermore comprises an isolation body 6, which is arranged on the conductor arrangement 5, and has openings 7*a*, 7*b*, 7*c* exposing the contact portions 2*a*, 2*b*, 2*c*. In the present exemplary embodiment, the isolation body 6 is moulded onto the conductor arrangement 5 and formed by a cohesive sheath surrounding the conductor arrangement 5 in portions. The isolation body 6 is made of an electrically isolating material, e.g. a plastic.

FIG. 1 furthermore shows a fastening portion 8 of the connection unit 1*a*. The fastening portion 8 is here formed for example by two latching elements 9a, 9b. The fastening portion 8 is designed to engage with a fastening portion 10 of a further connection unit 1b (see FIG. 3) such that the connection unit 1a and the further connection unit 1b can be transferred from a detached position into a fastened position. In the fastened position, the connection unit 1a and the further connection unit 1b are fastened to one another and the conductor arrangement 5 of the connection unit 1a and a conductor arrangement 5 (see FIG. 3) of the further connection unit 1b are electrically isolated from one another. In the present exemplary embodiment, the fastening portion 8 is formed by the isolation body 6.

FIG. 2 shows a view of a detail of the contact portion 2a, the illustration of, which is representative of the further contact portions 2b, 2c.

The connection unit 1a is distinguished in that the contact portion 2a has a guide 11, which is widened in comparison to a distance d of the first wall 3a from the second wall 3b. The guide 11 here adjoins the first wall 3a and the second wall 3b on a side of the first wall 3a and of the second wall 3b lying opposite the third wall 3c. The guide 11 for its part has a first wall 12a and a second wall 12b. The first wall 12a of the guide 11 adjoins the first wall 3a of the contact portion 2a on the side opposite the third wall 3c. The second wall 12b of the guide 11 adjoins the second wall 3b of the contact portion 2a on the side opposite the third wall 3c. The first wall 12a and the first wall 3a enclose an obtuse angle 13. Similarly, the second wall 3b and the second wall 12b enclose an obtuse angle. The walls 12a, 12b of the guide 11 each extend along a straight line. The straight lines intersect at an acute angle of around 60 degrees.

Figure 3:
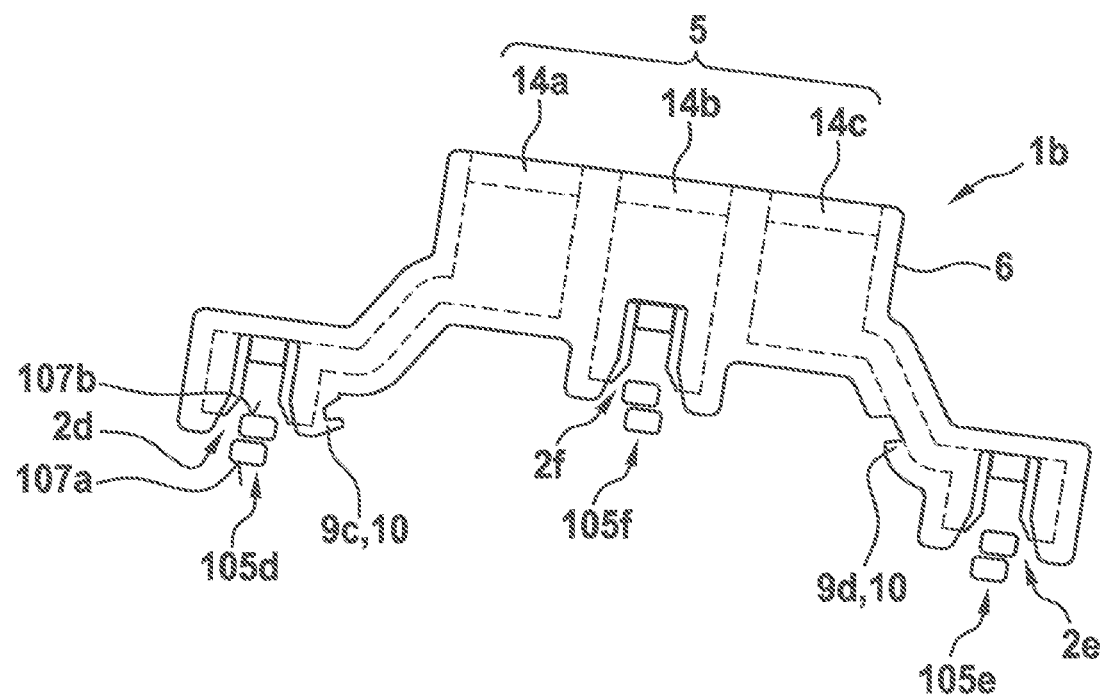
FIG. 3 shows a plan view of a second exemplary embodiment of the connection unit according to the invention.

FIG. 3 is a plan view of a second exemplary embodiment of a connection unit 1b. Unless specified otherwise below, all statements pertaining to the first exemplary embodiment can be applied to the second exemplary embodiment.

In the second exemplary embodiment, the conductor arrangement 5 is formed by a number of conductor portions 14a, 14b, 14c corresponding to the number of contact portions 2d, 2e, 2f. The conductor portions 14a, 14b, 14c are electrically isolated from one another and are each electrically conductively connected to one of the contact portions 2d, 2e, 2f. In the second exemplary embodiment, each conductor portion 14a, 14b, 14c is formed by a busbar. The isolation body 6 isolates the conductor portions 14a, 14b, 14c from one another and establishes the relative positions of the conductor portions 14a, 14b, 14c with respect to one another.

The connection unit 1b according to the second exemplary embodiment also has a fastening portion 10, which is formed by latching elements 9c, 9d.

Figure 4:
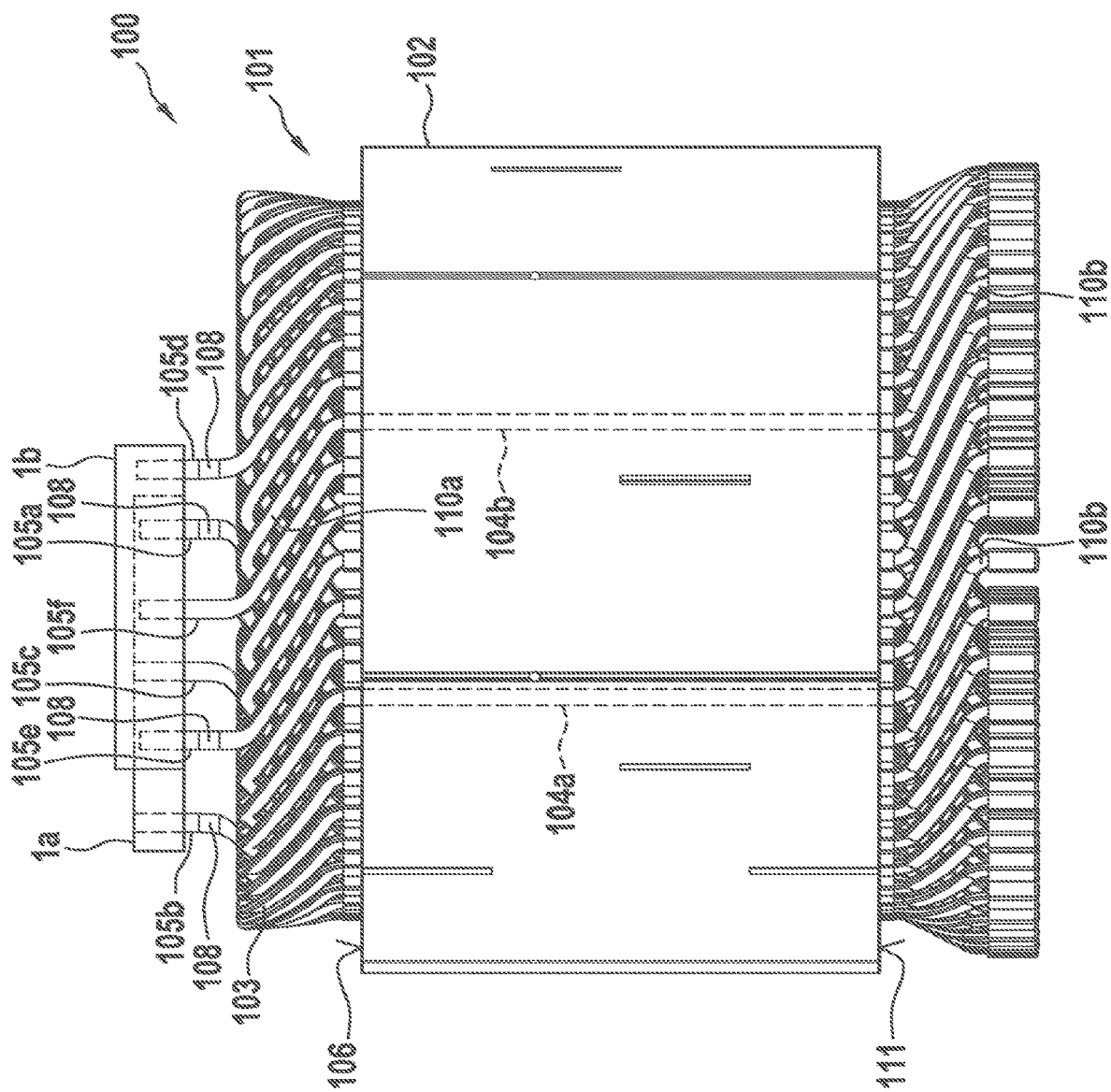
FIG. 4 shows a side view of an exemplary embodiment of the stator arrangement according to the invention with the first and second exemplary embodiment of the connection unit.

FIG. 4 is a side view of an exemplary embodiment of a stator arrangement 100. The stator arrangement 100 has a stator 101, a first connection unit 1a according to the first exemplary embodiment, and a second connection unit 1b according to the second exemplary embodiment.

The stator 101 has a stator core 102, which is here formed for example from a multiplicity of axially layered stator laminations, which are electrically isolated from each other and made from a soft magnetic material. In addition, the stator 101 has a stator winding 103, which is configured as a hairpin winding. The stator winding 103 comprises for example three phases and is formed in portions from shaped conductors 104a, 104b, which extend through the stator core 102. The stator winding 103 is furthermore formed in portions by first to sixth connection portions 105a to 105f, which extend in the axial direction at a first end face 106 of the stator core 102, adjoining a part of the shaped conductors 104a, 104b at different angular positions of a circumferential direction.

The first to third connection portions 105a, 105b, 105c are designed to form a star point. The fourth to sixth connection portions 105d, 105e, 105f are each designed to form a connection for the phases. The first to third connection portions 105a, 105b, 105c are arranged for example radially on the inside at the respective angular positions. The fourth to sixth connection portions 105d, 105e, 105f are arranged for example radially on the outside at a respective one of the angular positions.

With reference to FIG. 1 and FIG. 3, a cross section of a respective connection portion 105a-f has two parallel sides. The associated side faces 107a, 107b extend into the plane of the paper. For reasons of clarity, here only the first connection portion 105a in FIG. 1 and the fourth connection portion 105d in FIG. 3 are provided with reference signs. In the case of the stator 101, the first and second connection portions 105a, 105b are deformed relative to the third connection portion 105c in such a manner that the pairs of parallel side faces 107a, 107b of the first to the third connection portions 105a, 105b, 105c are aligned substantially parallel to one another. Without this deformation, the connection portions 105a, 105b, 105c would be aligned radially because of the substantially cylinder-symmetrical form of the stator 101, such that corresponding pairs of parallel side faces 107a, 107b would not be parallel but rather would stand obliquely to one another corresponding to their position in the circumferential direction.

Similarly, the fourth and the fifth connection portions 105d, 105e are also deformed relative to the sixth connection portion 105f in such a manner that the pairs of parallel side faces 107a, 107b of the fourth to the sixth connection portions 105d, 105e, 105f are aligned substantially parallel to one another. In the present exemplary embodiment, the pairs of parallel side faces 107a, 107b of all the connection portions 105a-f, i.e. the first to the sixth connection portions 105a-f, are not aligned parallel to one another. In other words, the pairs of parallel side faces 107a, 107b of the first to the third connection portions 105a, 105b, 105c on the one hand and the pairs of parallel side faces 107a, 107b of the fourth to the sixth connection portions 105d, 105e, 105f on the other hand enclose between them an angle, which is greater than zero degrees.

In the present exemplary embodiment, the connection portions 105a, 105b, 105d, 105e are deformed by torsion about an axis parallel to a longitudinal axis of the stator. For this purpose, FIG. 4 shows schematically torsion portions 108 in, which the profile of the connection portions 105a, 105b, 105d, 105e has the torsion.

In the present exemplary embodiment, for each of the phases, the stator winding 103 comprises two series circuits of shaped conductors 104a, 104b, which form parallel paths of the phase. In the present exemplary embodiment, each connection portion 105a-f comprises two connection elements 109a, 109b, which are provided with a reference sign only at the connection portion 105c in FIG. 1 for reasons of clarity. A respective connection element 109a, 109b integrally adjoins one of the shaped conductors 104a, 104b on the outside with respect to one of the series circuits.

The stator winding 103 is furthermore formed in portions by a multiplicity of connectors of the first type 110a and connectors of the second type 110b. The shaped conductors 104a, 104b of a respective phase are connected to one another to form the series circuits by the connectors of the first type 110a and connectors of the second type 110b. The connectors of the first type 110a are formed integrally with pairs of shaped conductors 104a, 104b. At a second end face 111 of the stator core 102 lying opposite the first end face 106, pairs of shaped conductors 104a, 104b which are not connected by connectors of the first type 110a are connected to one another by the connectors of the second type 110b. For this purpose, the connectors of the second type have two connecting elements. The connecting elements are each formed integrally with one of the shaped conductors 104a, 104b connected by the connectors of the second type 110b. The connecting elements are connected to one another by substance bonding, e.g. by welding, at the second end face 111.

Figure 5:
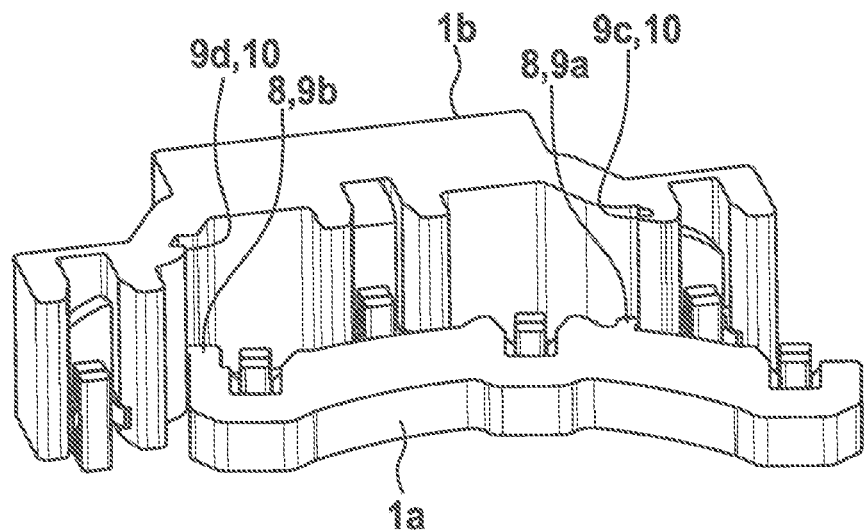
FIG. 5 shows a perspective view of a detail of the connection units in the fastened position.

FIG. 5 shows a perspective view of a detail of the connection units 1a, 1b of the stator arrangement 100 in a fastened position.

The fastening portions 8, 10 of the connection units 1a, 1b are connected by inter-meshing in the fastened position, such that the latching elements 9a, 9c and 9b, 9d form two latching connections.

FIGS. 6 to 8 each show a plan view of the connection units 1a, 1b at the transition from a detached position to the fastened position. The advantage of the guides 11 will also be explained with reference to said figures.

As can be gathered from FIG. 6, the pairs of parallel side faces 107a, 107b of the connection portions 105a, 105b, 105c are arranged substantially parallel to one another when they are not yet received in the receiving chambers 4 of the contact portions 2a, 2b, 2c. However, there are certain mutual position tolerances of the connection portions 105a to 105c and of the connection elements 109a, 109b. The same applies to the connection portions 105d to 105f.

As can be gathered from FIG. 7, the connection units 1a, 1b are moved towards one another in a linear movement direction perpendicular to the direction of extent of the connection portions 105a-f, as indicated by arrows in FIG. 7. The guides 11 here serve to compensate for the above-mentioned position tolerances. It should be noted that, in this exemplary embodiment, the connection portions 105a-f can be received in the receiving chambers 4 as a result of the deformation of the connection portions 105a, 105b, 105d, 105e. The required expenditure of force for guiding the connection portions 105a-f between the parallel walls 3a, 3b would namely be too high if the connection portions 105a-f were aligned radially.

FIG. 8 shows the connection units 1a, 1b in their fastened position in, which the fastening portions 8, 10 intermesh in a manner similar to that in FIG. 5. In this position, the contact portions 2a-f and the connection portions 105a-f may be joined together for example by welding.

FIG. 9 is a plan view of a third exemplary embodiment of a connection unit 1a. The connection unit 1b, also shown, corresponds to the second exemplary embodiment. All the statements relating to the first exemplary embodiment according to FIGS. 1 and 2 can be transferred to the third exemplary embodiment according to FIG. 9 apart from the differences described below.

In the third exemplary embodiment of the connection unit 1a, the fastening portion 8 is formed by the conductor arrangement 5, which for this purpose protrudes from the isolation body 6. According to an alternative exemplary embodiment, it is also possible for the fastening portion 10 of the connection unit 1b to be formed by the conductor arrangement 5 when the fastening portion 8 of the connection unit 1a is formed by the isolation body 6, as in the first exemplary embodiment.

FIG. 10 is a plan view of a fourth exemplary embodiment of a connection unit 1a and a fifth exemplary embodiment of a connection unit 1b. All the statements relating to the first and second exemplary embodiments according to FIGS. 1 to 3 can be transferred to the fourth and fifth exemplary embodiments apart from the differences described below.

In the fourth exemplary embodiment of the connection unit 1a, the fastening portion 8 is formed by protrusions 15a, 15b. In the fifth exemplary embodiment of the connection unit 1b, the fastening portion 10 is formed by recesses 16a, 16b, which have a diametrically opposed configuration to the protrusions 15a, 15b. The protrusions 15a, 15b and the recesses 16a, 16b correspond with one another in a similar way to two jigsaw pieces in order to fasten the connection units 1a, 1b to one another by means of a form fit. In the fourth and fifth exemplary embodiments, the connection units 1a, 1b are also connected so as to intermesh by a linear movement, in order to create the form-fitting connection. The movement direction of the linear movement, however, runs parallel to the direction of extent of the connection portions 105a-f.

FIG. 11 shows a plan view of a further exemplary embodiment of the stator arrangement 100 according to the invention with a sixth exemplary embodiment of a connection unit 1a and a seventh exemplary embodiment of a connection unit 1b.

In the present exemplary embodiments, the connection units 1a, 1b have no fastening portions. The stator arrangement 100 comprises a fastening means 17 (illustrated schematically) by means of, which the first connection unit 1a and the second connection unit 1b can be transferred from the detached position to the fastened position. The fastening means 17 is configured to force the connection unit 1a and the connection unit 1b together in the fastened position by a force acting on the connection units 1a, 1b, such that, in the fastened position, the connection portions 105a-f can be electrically conductively fastened to the contact portions 2a-f. This can be achieved for example by a substance-bonded joining technique, in particular by welding. The fastening means 17 is configured as an additional component separate from the connection units 1a, 1b. In the fastened position, in particular after producing the fastening of the connection portions 105a-f to the contact portions 2a-f, the fastening means is detachable such that the fastening means 17 does not remain on the stator arrangement 100.

FIG. 12 shows an end-face view of a detail of a stator 101 of a further exemplary embodiment of a stator arrangement 100. In the case of the stator 101, the connection portions 105a-f are radially aligned in their respective angular position in the circumferential direction.

FIGS. 13 to 15 each show a plan view of two connection units 1a, 1b according to an eighth and a ninth exemplary embodiment of the stator arrangement 1, which is shown in FIG. 12, during the transition from a detached position into a fastened position. For reasons of clarity, the illustration of the isolation body 6 and the fastening portions 8, 10 has been omitted in FIGS. 13 to 15. However, all the statements relating to the isolation body 6 and to the fastening portions 8, 10 from the previous exemplary embodiments can be transferred to the eighth and ninth exemplary embodiments.

FIG. 13 shows the connection units 1a, 1b in the detached position.

In the first connection unit 1a, the respective second wall 3b of the first contact portion 2a and of the second contact portion 2b is bevelled in a manner facing away from the receiving chamber 4. The guide 11 of the first contact portion 2a and of the second contact portion 2b is formed by the first wall 12a, which adjoins the first wall 3a of the first contact portion 2a or of the second contact portion 2b. This means that a second wall 12b is not provided in the guide 11 of the first contact portion 2a and of the second contact portion 2b. The third contact portion 2c corresponds to that of the first exemplary embodiment.

In the second connection unit 1b, the respective receiving chamber 4 of the first contact portion 2d and of the second contact portion 2e is open on a side lying opposite the first wall 3a. This means that a second wall is not provided in the first contact portion 2d and in the second contact portion 2e. The guide 11 of the first contact portion 2d and of the second contact portion 2e is formed by its first wall 12a, which adjoins the first wall 3a of the first contact portion 2d or of the second contact portion 2e. This means that a second wall 12b is not provided in the guide 11 of the second contact portion 2d and of the second contact portion 2e. The third contact portion 2c corresponds to that of the second exemplary embodiment.

As illustrated in FIGS. 14 to 15, the connection units 1a, 1b, analogously to FIGS. 6 to 8, are transferred from the detached position into the fastened position illustrated in FIG. 15. The bevelled second walls 3b of the first and second contact portions 2a, 2b of the first connection unit 1a here also enable the position tolerances to be compensated for in that the connection portions 105a, 105b can slide along the second walls 2a, 2b. As a result of the open configuration of the first and second contact portions 2d, 2e of the second connection unit 1b, the connection portions 105a, 105b can be prevented from becoming jammed during the linear movement. The arrangement of the connection units 1a, 1b on the connection portions 105a-f is therefore also permitted during the radial alignment thereof by the linear movement.

Exemplary embodiments of a method for producing a stator arrangement 100 that are explained in more detail with reference to FIGS. 1 to 15 will be described below.

According to a first exemplary embodiment of the method, a step of providing a first connection unit 1a and a step of providing a second connection unit 1b are provided. A further step of providing a stator 101 is also provided. The method furthermore comprises a step of arranging the first to the third connection portions 105a, 105b, 105c of the stator 101 in the receiving chamber 4 of a respective contact portion 2a, 2b, 2c of the connection unit 1a, and a step of arranging the fourth to the sixth connection portions 105d, 105e, 105f of the stator 101 in the receiving chamber 4 of a respective contact portion 2d, 2e, 2f of the second connection unit 1b. The arrangement steps take place by performance of a relative movement of the first connection unit 1a and the second connection unit 1b along a movement direction running substantially perpendicular to the direction of extent of the connection portions 105a-f when the connection units 1a, 1b correspond to the first to the third exemplary embodiments. When the connection units 1a, 1b correspond to the fourth and fifth exemplary embodiments, the movement direction is however parallel to the direction of extent of the connection portions 105a-f. In the sixth and seventh exemplary embodiments, the movement direction is arbitrary.

The method furthermore comprises a step of transferring the first connection unit 1a and the second connection unit 1b from a detached position into a fastened position by means of the fastening means 17 or fastening portions 8, 10, wherein, in the fastened position, the first connection unit 1a and the second connection unit 1b are fastened to one another and the conductor arrangement 5 of the first connection unit 1a and the conductor arrangement 5 of the second connection unit 1b are electrically isolated from one another.

The method furthermore comprises a step of joining the connection portions 105a-f and the contact portions 2a-f to form substance-bonded joint connections in the fastened position of the fastening portions 8, 10 or fastening means 17.

If the fastening means 17 according to FIG. 11 is used, then after the joining, the method can furthermore comprise the following step: removing the fastening means 17 by transferring it from the fastened position to the detached position.

FIG. 16 is a schematic diagram of a vehicle 200 with an exemplary embodiment of an electric machine 201, which is designed to drive the vehicle 200.

The electric machine 201 comprises a stator arrangement 100 according to one of the above-described exemplary embodiments, or a stator arrangement 100 obtained by the method, and a rotor 202 mounted rotatably inside the stator arrangement 100. The electric machine 201 is designed as part of a drive train of the vehicle 200. The electric machine 201 can be a synchronous machine. The rotor 202 is preferably permanently excited. Alternatively, the electric machine 201 is an asynchronous machine.

The vehicle 200 can accordingly be a battery electric vehicle (BEV) or a hybrid vehicle.

The invention claimed is:

1. Connection unit for a stator with a stator winding having a number N of phases, having first to Nth contact portions, which are each designed for electrically conductively contacting one of N connection portions of the stator, form a receiving chamber for receiving one of the connection portions and have a guide,
    wherein a respective contact portion has a wall, which limits the receiving chamber on one side, and the guide of the contact portion has a wall, which adjoins the wall of the contact portion and is bevelled with respect to the wall of the contact portion in a manner facing away from the receiving chamber,
    a conductor arrangement, which either electrically conductively connects the first to Nth contact portions or comprises N conductor portions, which are electrically isolated from one another and are each electrically conductively connected to one of the contact portions,
    an isolation body, which is arranged on the conductor arrangement and has openings exposing the contact portions, and
    a fastening portion, which is designed to engage with a fastening portion of a further connection unit in such a manner that the connection unit and the further connection unit can be transferred from a detached position into a fastened position, in, which the connection unit and the further connection unit are fastened to one another and the conductor arrangement of the connection unit and a conductor arrangement of the further connection unit are electrically isolated from one another.

2. Connection unit according to claim 1, wherein the Nth contact portion has a second wall, which limits the receiving chamber on one side lying opposite to the first wall, and therefore the Nth contact portion is designed for surrounding the connection portion, wherein the guide of the Nth contact portion has a second wall, which adjoins the second wall of the contact portion and is bevelled with respect to the second wall (3b) of the Nth contact portion in a manner facing away from the receiving chamber such that the guide is widened in comparison to a distance of the first wall of the contact portion from the second wall of the Nth contact portion.

3. Connection unit according to claim 1, wherein the Nth contact portion has a third wall, which limits the receiving chamber in a direction perpendicular to the first wall.

4. Connection unit according to claim 1, wherein the receiving chamber of a respective one of the first to (N−1)th contact portions is open lying opposite to the first wall.

5. Connection unit according to claim 1, wherein the first to (N−1)th contact portions each have a second wall, which lies opposite the first wall and is bevelled in a manner facing away from the receiving chamber.

6. Connection unit according to claim 2, wherein a respective one of the first to (N−1)th contact portions has a second wall, which limits the receiving chamber on one side lying opposite to the first wall, and therefore the respective contact portion is designed for surrounding the connection portion, wherein the first and second walls of the N contact portions are oriented parallel to one another.

7. Connection unit according to claim 6, wherein the guide of a respective one of the first to (N−1)th contact portions has a second wall, which adjoins the second wall of the contact portion and is bevelled with respect to the second wall of the respective contact portion in a manner facing away from the receiving chamber such that the guide is widened in comparison to a distance of the first wall of the contact portion from the second wall of the respective contact portion.

8. Connection unit according to claim 1, wherein the first to (N−1)th contact portions each have a further wall, which limits the receiving chamber in a direction perpendicular to the first wall.

9. Stator arrangement for an electric machine, having:
a stator, having a stator core with an axial end face and a stator winding, which has a number N of phases and is formed in portions from shaped conductors, which extend through the stator core, and from first to Nth connection portions, which extend in the axial direction at the end face, adjoining a part of the shaped conductors in different angular positions of a circumferential direction, and are designed either for forming a star point or for forming connections for the phases; and
a connection unit according to claim 1, wherein the first to Nth connection portions are each received in the receiving chamber of a contact portion of the connection unit.

10. Stator arrangement according to claim 9, wherein the conductor arrangement of the first connection unit electrically conductively connects the contact portions to form a star point, wherein the stator arrangement furthermore has: a second connection unit having a number N of phases, having
first to Nth contact portions, which are each designed for electrically conductively contacting one of N connection portions of the stator, form a receiving chamber for receiving one of the connection portions and have a guide, wherein a respective contact portion has a wall, which limits the receiving chamber on one side, and the guide of the contact portion has a wall, which adjoins the wall of the contact portion and is bevelled with respect to the wall of the contact portion in a manner facing away from the receiving chamber, and
a conductor arrangement, which either electrically conductively connects the first to Nth contact portions or comprises N conductor portions, which are electrically isolated from one another and are each electrically conductively connected to one of the contact portions, wherein
the conductor arrangement of, which comprises N conductor portions, which are electrically isolated from one another and are each electrically conductively connected to one of the N contact portions in order to form a connection for one of the phases, wherein the (N+1)th to (2N)th connection portions are each accommodated in the receiving chamber of a contact portion of the second connection unit, wherein in particular a fastening means is provided by means of, which the first connection unit and the second connection unit can be transferred from a detached position into a fastened position, in, which the first connection unit and the second connection unit are fastened to one another and the conductor arrangement of the first connection unit and the conductor arrangement of the second connection unit are electrically isolated from one another.

11. Method for producing a stator arrangement, comprising the following steps:
providing a connection unit according to claim 1;
providing a stator for an electric machine, having a stator core with an axial end face and a stator winding, which comprises a number N of phases and is formed in portions from shaped conductors, which extend through the stator core, and from first to Nth connection portions, which extend in the axial direction at the end face, adjoining a part of the shaped conductors in different angular positions of a circumferential direction, and are designed either for forming a star point or for forming connections for the phases; and
arranging the first to Nth connection portions of the stator in the receiving chambers of the contact portions of the connection unit, in particular by performing a relative movement of the connection unit along a movement direction running substantially perpendicular or parallel to a direction of extent of the connection portions;
and in particular joining the connection portions and the contact portions.

12. Method according to claim 11, wherein the first to Nth connection portions are designed for forming a star point, wherein the stator winding is furthermore formed in portions from (N+1)th to (2N)th connection portions, which extend in the axial direction at the end face, adjoining a part of the shaped conductors in different angular positions of a circumferential direction, and are designed for forming connections for the phases,
furthermore comprising the following steps:
providing a second connection unit having a number N of phases, having
first to Nth contact portions, which are each designed for electrically conductively contacting one of N connection portions of the stator, form a receiving chamber for receiving one of the connection portions and have a guide, wherein a respective contact portion has a wall, which limits the receiving chamber on one side, and the guide of the contact portion has a wall, which adjoins the wall of the contact portion and is bevelled with respect to the wall of the contact portion in a manner facing away from the receiving chamber, and
a conductor arrangement, which either electrically conductively connects the first to Nth contact portions or comprises N conductor portions, which are electrically isolated from one another and are each electrically conductively connected to one of the contact portions, wherein the conductor arrangement of, which comprises N conductor portions, which are electrically isolated from one another and are each electrically conductively connected to one of the N contact portions in order to form a connection for one of the phases; and arranging the (N+1)th to (2N)th connection portions of the stator in the receiving chambers of the contact portions of the second connection unit, in particular by performing a relative movement of the second connection unit along a movement direction running substantially perpendicular or parallel to a direction of extent of the connection portions.

13. Method according to claim 12, furthermore comprising the following step:

transferring the first connection unit and the second connection unit from a detached position into a fastened position by means of a fastening means or by means of fastening portions formed by the connection units, wherein, in the fastened position, the first connection unit and the second connection unit are fastened to one another and the conductor arrangement of the first connection unit and the conductor arrangement of the second connection unit are electrically isolated from one another; wherein in particular a step is provided of removing the fastening means by transferring it from the fastened position into the detached position after the connection portions and the contact portions are joined.

14. Electric machine for driving a vehicle, having: a stator arrangement according to claim 9; and a rotor rotatably mounted inside the stator.

15. Connection unit according to claim 2, wherein the Nth contact portion has a third wall, which limits the receiving chamber in a direction perpendicular to the first wall.

16. Connection unit according to claim 2, wherein the receiving chamber of a respective one of the first to (N−1)th contact portions is open lying opposite to the first wall.

17. Connection unit according to claim 2, wherein the first to (N−1)th contact portions each have a second wall, which lies opposite the first wall and is bevelled in a manner facing away from the receiving chamber.

18. Connection unit according to claim 3, wherein a respective one of the first to (N−1)th contact portions has a second wall, which limits the receiving chamber on one side lying opposite to the first wall, and therefore the respective contact portion is designed for surrounding the connection portion, wherein the first and second walls of the N contact portions are oriented parallel to one another.

19. Connection unit according to claim 2, wherein the first to (N−1)th contact portions each have a further wall, which limits the receiving chamber in a direction perpendicular to the first wall.

* * * * *